June 11, 1929. G. F. SHOTTER 1,716,838
APPARATUS FOR THE MEASUREMENT OF THE LEVEL AND FLOW OF LIQUIDS
Filed July 22, 1925 3 Sheets-Sheet 1

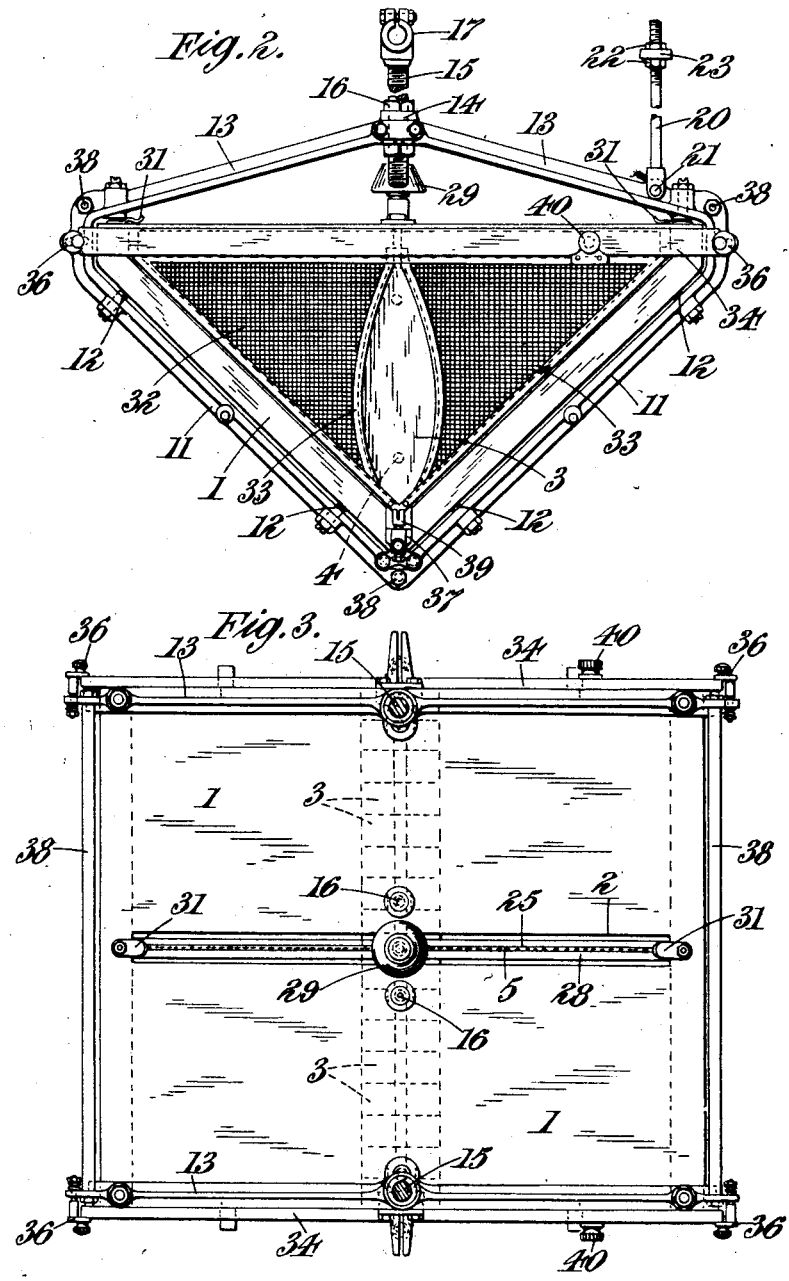

June 11, 1929. G. F. SHOTTER 1,716,838
APPARATUS FOR THE MEASUREMENT OF THE LEVEL AND FLOW OF LIQUIDS
Filed July 22, 1925 3 Sheets-Sheet 3
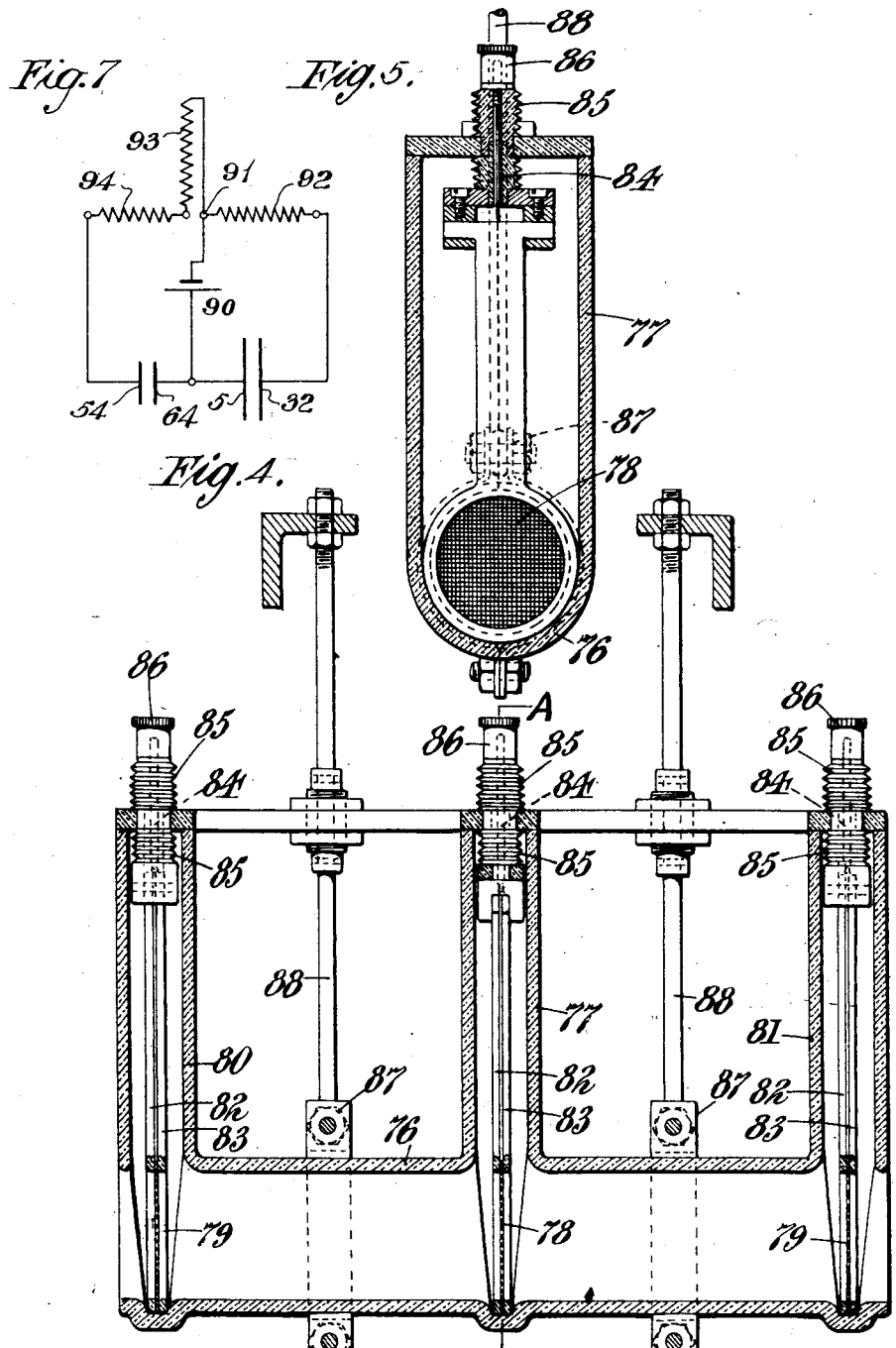

Patented June 11, 1929.

1,716,838

UNITED STATES PATENT OFFICE.

GEORGE FREDERICK SHOTTER, OF NEW SOUTHGATE, ENGLAND.

APPARATUS FOR THE MEASUREMENT OF THE LEVEL AND FLOW OF LIQUIDS.

Application filed July 22, 1925, Serial No. 45,348, and in Great Britain September 23, 1924.

This invention relates to apparatus for the measurement of the level and flow of liquids and it has for its object improvements by which certain advantages shall be obtained.

In the specification of prior British Letters Patent No. 17,044 of 1911, granted to the applicant herein, apparatus is described for the electrical measurement of the level or flow of a liquid comprising a main or level measuring pair of electrodes at a fixed distance apart so immersed in the liquid that the resistance between them changes when the level changes within the limits to be observed, in combination with a compensating pair of electrodes immersed to a constant degree in the liquid or in liquid of similar polarizing properties, an electrical generator and a resistance indicator which has a control-producing circuit and a circuit to provide a deflecting force, the parts being so connected that the generator, the control-producing circuit and the compensating electrodes are in one closed circuit and the generator, the circuit to provide deflecting force and the main electrodes are in a second closed circuit.

The present invention relates to apparatus of the kind described above and more particularly to the construction and arrangement of the electrodes.

According to the present invention, in apparatus for the measurement of the level or flow of liquids of the kind described above a pair of electrodes is mounted on or in a tubular member of insulating material, such as glazed earthenware, of triangular, circular or other section. Preferably one of the electrodes is mounted within; midway of the length and transversely of the tubular member; and the other electrode is in two parts which are mounted at opposite ends of the said tubular member. The tubular member may have a slot midway of its length for the insertion of the electrode and a second tubular member, also of insulating material, surrounding said slot and extending outwards from the first mentioned tubular member.

Forms of the invention will now be described with reference to the accompanying drawings wherein:—

Fig. 2 shows an end view thereof, and

Fig. 3 shows a plan;

Figure 4 shows an elevation in section of a form of compensating electrodes;

Fig. 5 shows a section at the line A, B of Fig. 4, and

Fig. 7 is a diagram illustrating the electrical connections of the apparatus.

Figure 1:
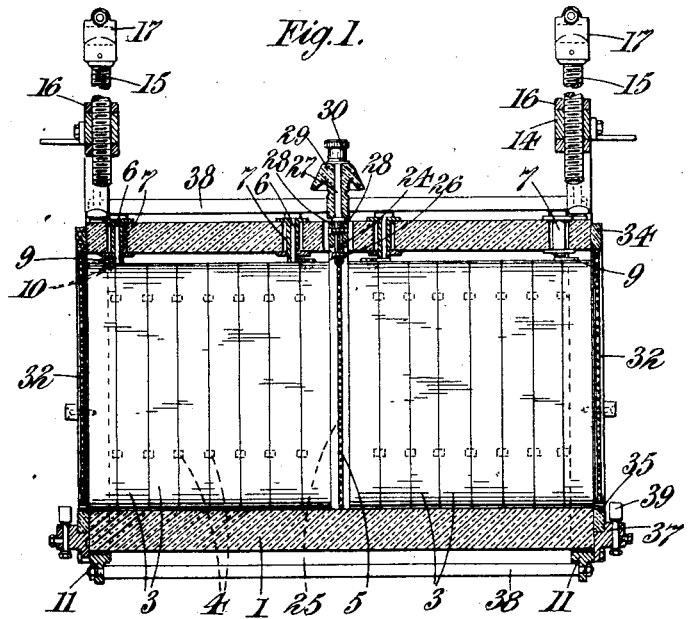
Fig. 1 shows a side elevation in section of one form of the main electrodes.

Referring to Figs. 1, 2 and 3 which show one form of main or level-measuring pair of electrodes, a tubular member 1 of triangular section is formed of insulating material, such as glazed earthenware. Midway of its length, and preferably on the top face is formed an opening 2, extending across the face and through which one of the electrodes is inserted into the interior of the tubular member 1 so as to extend transversely thereof. Within the tubular member is mounted a shield 3, 3 also of insulating material, for example ebonite, a phenol condensation compound, glazed earthenware, or the like. This shield is in two parts and extends from each side of the opening 2, to the ends of the tubular member. Conveniently it is in a number of parts 3, 3 all exactly similar and provided with positioning means, such as co-operating pins and depressions 4 in adjacent faces, so that they are easily mounted in correct relationship. The shield is of a shape to produce a sectional area and shape of path between the electrodes such that the relationship between the area of path and the flow of the liquid over a notch with which the apparatus is employed is expressed by a straight line law. The shape of the shield is such that the difference between the area of the triangular shape, minus the area of the shield is, for all heights above the zero or apex of the path, proportional to the flow of the liquid over the notch, viz:—

$$\frac{(\text{Area of triangular path} - \text{area of shield}) \text{ at height X}}{\text{Flow at height X}} = \text{a constant}$$

when the zero of the path is at the same level as the zero of the notch.

In the case of a V notch this differential area is proportional to $H^{2.47}$, and in the case of a rectangular notch to $H^{1.47}$. A shield of the shape shown in the drawings is employed when the apparatus is used with a V-notch; for the other notches or other sections of tubular member the shape of the shield will vary. In some cases the shield may be dispensed with. The sections of the shield adjacent the central electrode 5 and the outer ends of the tubular member are secured by screwed rods 6 mounted on bushed holes 7 in the top face of the tubular member 1. Each rod 6 engages a hole in a plate 9 secured by screws 10 to the last section of the shield. It will be understood that various means may be employed for positioning and securing the end sections of the shield; for example, the rods 6 may engage holes in said end sections.

The tubular member is carried by a frame 11 arranged at each end. These frames are conveniently of cast metal. The tubular member 1 rests on adjustable studs 12 which project from the two walls of each frame which are arranged at an angle corresponding with the angle of the tubular member. The two upper sides 13 of the frame 11 slope upwards and at their junction is formed a boss 14, through which passes a threaded rod 15 secured by nuts, 16, 16. At its upper end the rod is carried by a sleeve 17 on a rod 18 which is carried on suitable supports 19 (see Fig. 6) in or above the container for the liquid in connection with which the instrument is employed. A further rod 20 is pivotally mounted at 21 on a side 13 of one of the frames 11. The upper end of the rod 20 is threaded and secured by nuts 22 to a bracket 23 on the support 19.

The central electrode 5 which is usually the anode is of platinized gauze of a shape corresponding with the interior of the tubular member 1, with the centre portion, of a shape corresponding to that of the shield 3, removed. The edges of the inner or shaped part of the gauze are clamped between two pieces of insulating material, such as ebonite, or the material known under the registered trademark bakelite, of the same section as the shield 3, and a stiff wire is soldered round the outer edge. A flexible conducting strip 24, such as phosphor-bronze is electrically connected as by soldering to the upper part of the gauze 25. This strip is secured by a screw 26, and soldered between the bifurcated ends of a conducting rod 27. The rod 27 is clamped between two bars 28 of insulating material and it passes through an insulator 29 to a terminal 30. The electrode is positioned by packing strips or plugs inserted in the slots 2 at its ends and it is held in position by spring clips 31 which are pivoted so that they may be moved over the top of the bars, 28, 28.

The other electrode, usually the cathode, is in two parts mounted at opposite ends of the tubular member 1. Each part consists of a sheet of metal gauze, such as of nickel plated copper 32, of substantially the same shape as the interior of the tubular member 1, and with the centre portion of a shape corresponding to the section of the shield 3, removed. The gauze is mounted in a frame 33, which may be of angle or U-section, by soldering on one face thereof so that it may be brought up level with the end of the tubular member 1.

The upper bar of the frame is secured, as by screws, to a bar 34 of insulating material, and the lower end of the frame is secured to a small block 35 of insulating material. The electrode is held in place by locking members 36, 36 mounted on frames 11, so that they may be turned into or out of engagement with the bar 34. At the lower end the block 35 rests in a bracket 37, mounted on a frame 11. The size and mounting of the electrodes is such that they are just clear from the ends of the tubular member 1. When the shield 3 is dispensed with the centre portion of the gauze is not removed. The two frames 11 are connected by rods 38. On each bracket 37 is mounted a gauge member 39. On each bar 34 is mounted a terminal 40 which is electrically connected to the gauze 32.

Figures 4 and 5 show one form of compensating electrodes. A hollow cylindrical member 76 of glazed earthenware has an opening at about the middle extending half way round and a tubular extension 77 covering this opening. The anode 78 of the wire gauze is of circular form and is inserted in the centre of the tube 76 through the hollow extension 77. The cathode is in two parts 79, 79 which may be arranged one over each end of the cylindrical member 76, but preferably they are positioned by being inserted through hollow extensions 80, 81, arranged at opposite ends of the tube 76. The electrodes are of wire gauze and are conveniently constructed by clamping the gauze between two insulating parts, 82, 83. The electrical connection to the gauze is made by a wire passing between the two parts 82, 83 to a metal rod 84 mounted in insulators 85 and connected to a terminal 86. A similar construction is convenient for the anode 78, and it will be understood that various modifications may be made without departing from the invention. The tubular member 76 is carried by frames 87 of ring form and rods 88.

In use the level measuring pair of electrodes are supported in the liquid whose height or flow is to be measured in such a position that the surface of the liquid does not rise above the level of the top of the inside of the tubular member 1, in and on which the electrodes are mounted, and does not fall below the bottom of the inside of the tubular member. The compensating pair of electrodes are supported in such a way that they are always completely immersed in liquid of similar polarizing properties, to the liquid in which the main or level measuring electrodes are supported and the term "liquid of similar polarizing properties" is in the specification and claims to be understood to cover the liquid whose level is being measured.

Figure 6:
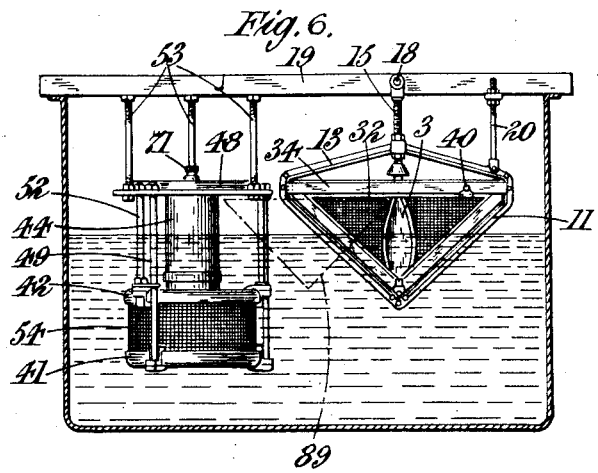
Fig. 6 shows a complete instrument suspended in liquid, whose height or flow is to be measured.

The electrical circuits connecting the electrodes and the indicating device are shown in diagram in Fig. 7. In this diagram the compensating electrodes are indicated at 54, 64 and the main electrodes at 5 and 32. One of the compensating electrodes 64 is connected to one of the main electrodes 5 and the junction is connected to one pole of an electric battery 90 whose other pole is connected to a point 91 where the circuit bifurcates. One path from this point of bifurcation is through a coil 92 of the resistance indicator to the main electrode 32, while the other path from the point 91 is through two coils 93, 94 of the resistance indicator arranged in series with one another, to the compensating electrode 54. The coils 93, 94 are arranged to produce magnetic fluxes at right angles to one another which combine to give a controlling force in the instrument. The coil 92 provides a deflecting force in the form of a magnetic flux helping or opposing that produced by the coil 94. The controlling and deflecting forces operate conjointly upon a piece of moving iron in any manner which is well known in electrical instruments. It will be readily observed that the arrangement of the coils 92, 93, 94 embodies the principle commonly employed in an ohmmeter and the indications of the instrument are therefore such as with suitable graduation of the scale will indicate the resistance between the electrodes 32 and 5 independently of the voltage applied by the battery 90 and also independently of the E. M. F. of polarization, since this latter E. M. F. operates in, and in the same direction in both the circuit containing the coil 92 and that containing the coils 93, 94. The resistance between the electrodes 32 and 5 varies in accordance with the height of the liquid. Since the flow of the liquid is a function of the level measured by the instrument the scale may be calibrated to read height or flow of the liquid. When the apparatus is employed to measure flow of liquid over a notch, the bottom of the main electrode is arranged so that it is just level with the bottom of the notch. Such an arrangement is illustrated in Fig. 6 in which 89 indicates a V-notch. The instrument is calibrated by means of a hook gauge applied to the part 39.

The form of standard path or compensating electrodes illustrated in Figs. 4 and 5 is preferably used in connection with high conductivity liquids.

The electrodes have been described as constructed of wire gauze, but it will be understood that they may, if desired, be formed of wire, preferably platinum or platinized wire wound on frames of insulating material. Further the gauze may be of other metal than platinized copper, such for example as nickel or ferro-nickel, though platinum or platinized metal is preferred.

The well known system of guard wiring may be applied to the apparatus for the purpose of preventing the measurement of leakage currents.

It will be understood that various modifications may be made without departing from the invention. For example, the shield instead of being made up of parts 3, may, if desired, be solid.

Recording apparatus and/or integrating apparatus for example that described in the specification of my prior British Letters Patent No. 163,739 may be employed in conjunction with the apparatus according to the present invention.

If it is necessary or advisable in any particular case to construct the tubular member of the main electrode system in two or more parts which have to be jointed, it may be advantageous to provide a leakage path of known dimensions below the bottom of the electrode, and in these circumstances the leakage current through this path will be compensated for by passing a small portion of the standard path current through the third coil on the indicator, opposing the coil carrying the current flowing between the main electrodes.

What I claim is:—

1. For apparatus of the kind described for the electrical measurement of the level of a liquid in combination a horizontal open-ended tubular carrier of insulating material having a slot midway of its length and a pair of electrodes one inserted through the slot and mounted transversely of said tubular carrier midway of its length and the other electrode in two parts mounted at opposite ends of the tubular carrier.

2. For apparatus of the kind described for the electrical measurement of the level of a liquid in combination a horizontal open-ended tubular carrier of insulating material having a slot midway of its length, a main pair of electrodes to be immersed in the liquid that the resistance between them changes when the level changes within the limits to be observed one electrode inserted through the slot and mounted transversely of said tubular carrier midway of its length and the other electrode in two parts mounted at opposite ends of the tubular carrier and a fixed shield between the electrodes of a shape to produce a desired relationship between the current which flows between the electrodes and the height of the liquid therebetween.

3. For apparatus of the kind described for the electrical measurement of the level of a liquid in combination a horizontal open-ended tubular carrier of insulating material having a slot midway of its length, a main pair of electrodes to be so immersed in the liquid that the resistance between them changes when the level changes within the limits to be observed one electrode inserted through the slot and mounted transversely of said tubular carrier midway of its length and the other electrode in two parts mounted at opposite ends of the tubular carrier and a fixed shield between the electrodes of a shape to produce a desired relationship between the current which flows between the electrodes and the height of the liquid therebetween, said shield being built up of a number of parts of insulating material of similar section arranged face to face and each having positioning means.

4. For apparatus of the kind described for the electrical measurement of the level of a liquid in combination a horizontal open-ended tubular carrier of insulating material having a slot midway of its length, a main pair of electrodes to be so immersed in the liquid that the resistance between them changes when the level changes within the limits to be observed one electrode inserted through the slot and mounted transversely of said tubular carrier midway of its length and the other electrode in two parts mounted at opposite ends of the tubular carrier and a fixed shield between the electrodes of a shape to produce a desired relationship between the current which flows between the electrodes and the height of the liquid therebetween and means to secure the shield within the tubular carrier.

5. For apparatus of the kind described for the electrical measurement of the level of a liquid in combination a horizontal open ended tubular carrier of insulating material having a slot midway of its length, a main pair of electrodes to be so immersed in the liquid that the resistance between them changes when the level changes within the limits to be observed on electrodes inserted through the slot and mounted transversely of said tubular carrier midway of its length and the other electrode in two parts mounted at opposite ends of the tubular carrier, a fixed shield between the electrodes of a shape to produce a desired relationship between the current which flows between the electrodes and the height of the liquid therebetween, frames to carry the tubular carrier and means to suspend the frames from a support.

6. For apparatus of the kind described for the electrical measurement of the level of a liquid in combination a horizontal open-ended tubular carrier of insulating material having a slot midway of its length, a main pair of electrodes to be so immersed in the liquid that the resistance between them changes when the level changes within the limits to be observed one electrode inserted through the slot and mounted transversely of said tubular carrier midway of its length and the other electrode in two parts mounted at opposite ends of the tubular carrier, a fixed shield between the electrodes of a shape to produce a desired relationship between the current which flows between the electrodes and the height of the liquid therebetween, frames to carry the tubular carrier, means to suspend the frames from a support and a shield between the electrodes of a shape to produce a desired relationship between the current which flows between the electrodes and the height of the liquid therebetween.

7. For apparatus of the kind described for the electrical measurement of the level of a liquid in combination a horizontal open-ended tubular carrier of insulating material and a pair of electrodes mounted transversely thereof one within, midway of the length of said tubular carrier and the other in two parts mounted at opposite ends of said tubular carrier.

GEORGE FREDERICK SHOTTER.